Patented Sept. 4, 1951

2,566,592

UNITED STATES PATENT OFFICE 2,566,592

STABILIZED IODOXY BENZOIC COMPOUNDS AND THE METHOD OF PRODUCING

Thomas Carl Aschner, Philadelphia, Pa., assignor to Smith, Kline & French Laboratories, Philadelphia, Pa., a corporation of Pennsylvania No Drawing. Application July 1, 1950,
Serial No. 171,762

6 Claims. (Cl. 260—453)

This invention relates to stabilized iodoxy benzoic compounds and a method of making them.

Iodoxy benzoic acid and its salts have wide utility as medicinals, particularly in the therapy of rheumatic conditions. The calcium and ammonium salts are particularly effective, being normally administered in the dry form as a powder or as tablets.

The utility of these compounds has been severely restricted due to dangers inherent in their production and distribution. Unless they contain a considerable amount of moisture, they are highly explosive. Consider, for example, calcium ortho-iodoxy benzoate which exists in several hydrated forms ranging from $9H_2O$ to the monohydrate. The $9H_2O$ compound down to the $6H_2O$ compound forms of calcium ortho-iodoxy benzoate are stable to percussion and friction. The mono-hydrate, on the other hand, is extremely unstable and the anhydrous form of this compound as well as of the other salts and the acid are known to decompose explosively at a temperature of about 210° C. and are as good explosives as black powder.

It will thus be apparent that the handling of these compounds using conventional production techniques is extremely dangerous. Conventional process steps such as drying, grinding and compressing all generate heat which will readily cause the anhydrous forms to explode. Even where the hydrated forms are used, there is great danger since local overheating incident to, for example, pressure incident to tableting leads to local detonations which can set off a chain type reaction resulting in the explosion of the whole batch being processed.

It is, therefore, the principal object of this invention to provide iodoxy benzoic acid and its salts in stabilized forms.

As hereinafter used in the specification and claims the term iodoxy benzoic compounds is intended to embrace iodoxy benzoic acid and its salts.

The method in accordance with this invention comprises taking an iodoxy benzoic compound and combining it with sorbitol which is 1,2,3,4,5,6-hexahydroxyhexane, $$CH_2OH.(CHOH)_4.CH_2OH$$

That a stable product results is surprising since analogous substances such as, for example, manitol, a glycerine, polyethylene glycol and ethylene glycol, when combined with an iodoxy benzoic compound within practical limits, fail to produce a stable product.

More specifically, in carrying out the method in accordance with this invention, the selected iodoxy benzoic compound is placed in an aqueous solution of sorbitol. A concentration of from 20–55% for the sorbitol solution has been found to be highly satisfactory. Desirably, the admixture is mildly agitated until sorbitol forms of from about 7 to 15% by weight of the combined iodoxy benzoic compound and sorbitol exclusive of moisture. This generally takes about an hour.

The resulting slurry is then separated from the sorbitol solution by filtration, centrifuging, or any other well known method of separating a solid from a liquid. The separated product is then dried at, for example, room temperature or at a slightly elevated temperature. The resulting product containing about 7 to 15% of sorbitol is substantially non-explosive. The analytical stability of the product at ordinary or slightly elevated temperatures is satisfactory and the therapeutic value is equal to that of the iodoxy benzoic compounds uncombined.

Optimum stability is obtained where at least the theoretical amount of hydroxyl groups required for the complete reduction of two atoms of oxygen per mole of iodoxy benzoic compound is present. Full protection against explosion is obtained where the sorbitol is present in an amount by weight in excess of 9%.

When iodoxy benzoic salts are prepared by precipitation and centrifuging from an aqueous solution, the usual method, the resulting centrifuge cake can be simply reslurried in a sorbitol solution. This completely eliminates the handling of ordinarily explosive iodoxy benzoic salts in any but a stable form.

The following examples further clarify the method in accordance with this invention.

Example 1

1000 grams of centrifuged-calcium o-iodoxy benzoate containing 16% of water was placed in an equal weight of a 30% aqueous sorbitol solution. The mixture was then agitated for one hour. The resulting suspension was then centrifuged and dried at room temperature. The resulting product contained twelve per cent. sorbitol by weight.

It was attempted to detonate the anhydrous, sorbitolized product by friction, impact, shock, and by a hot spark. All of these attempts failed to result in an explosion.

When subjected to slow heating, the product started to sinter and actually melt at a temperature of about 110° C. Eventually white to yellow fumes evolved in a slow and regular fashion. The residue was found to consist of a brown to black amorphous powder which will not burn when touched with a flame and will not explode under any circumstances.

Example 2

1000 grams of ammonium o-iodoxy benzoate was treated with 30% aqueous sorbitol solution in a manner identical with that described in Example 1. The resulting product is similarly stable to explosion.

Example 3

100 grams of o-iodoxy benzoic acid was treated with 30% aqueous sorbitol solution in a manner identical with that described in Example 1. The resulting product is similarly stable to explosion.

The precise mechanism involved in the stabilization of iodoxy benzoic compounds by the method in accordance with this invention is not known. It is believed, however, that the sorbitol is adsorbed in a manner comparable to the adsorption of water or alcohol of crystallization, complexes between the iodoxy benzoic compounds and the sorbitol being formed.

It is probable that the actual thermal decomposition of iodoxy benzoic compounds proceeds in two steps. In the first step, strong oxidizing agents, iodate or possibly oxygen, are liberated in an endothermic fashion. The second step is a very strongly exothermic oxidation of either iodoxy benzoic compounds or their resulting fragments. This second exothermic and very rapid step is believed to be responsible for the propagation of the thermal decomposition in an explosive fashion. It is believed that the adsorption of sorbitol provides a compound having a preferential oxidation by any oxidizing agents liberated from the iodoxy benzoic compounds at temperatures much below the explosive range of the iodoxy benzoic compounds and with a very small positive heat factor.

Applicant does not desire to be limited except as set forth in the following claims.

What is claimed is:

1. The method of forming a stabilized o-iodoxy benzoic compound which comprises admixing a member selected from the group consisting of o-iodoxy benzoic acid and its salts with an aqueous sorbitol solution and separating the reaction product from the sorbitol solution.

2. The method of forming a stabilized o-iodoxy benzoic compound which comprises admixing a member selected from the group consisting of o-iodoxy benzoic acid and its salts with an aqueous sorbitol solution until the o-iodoxy benzoic compound contains not less than 7% by weight of sorbitol exclusive of moisture and separating the reaction product from the sorbitol solution.

3. The method of forming a stabilized o-iodoxy benzoic compound which comprises admixing a member selected from the group consisting of o-iodoxy benzoic acid and its salts with an aqueous sorbitol solution of from 20 to 50% until the o-iodoxy benzoic compound contains not less than 7% by weight of sorbitol exclusive of moisture and separating the reaction product from the sorbitol solution.

4. A new composition of matter which comprises a member selected from the group consisting of o-iodoxy benzoic acid and its salts in combination with sorbitol.

5. A new composition of matter which comprises a member selected from the group consisting of o-iodoxy benzoic acid and its salts in combination with not less than 7% by weight of sorbitol.

6. A new composition of matter which comprises calcium o-iodoxy benzoate in combination with sorbitol.

THOMAS CARL ASCHNER.

No references cited.